United States Patent [19]

Ciambrone

[11] 4,007,118
[45] Feb. 8, 1977

[54] OZONE OXIDATION OF WASTE WATER

[75] Inventor: David Fred Ciambrone, Santee, Calif.

[73] Assignee: Cubic Corporation, San Diego, Calif.

[22] Filed: Oct. 16, 1975

[21] Appl. No.: 622,816

[52] U.S. Cl. .............................. 210/63 Z; 210/64; 210/150; 210/282; 23/288 R; 21/74 A

[51] Int. Cl.² ............................................ C02B 1/38

[58] Field of Search ............ 210/63 Z, 192, 50, 64, 210/60, 282, 150; 21/74 A, 53; 23/288 R, 288 B, 288 E, 288 A, 288 S, 288 F

[56] References Cited

UNITED STATES PATENTS

| 1,341,913 | 6/1920 | Leggett | 210/63 Z |
|---|---|---|---|
| 2,660,559 | 11/1953 | Prime | 210/192 |
| 2,690,425 | 9/1954 | Moses et al. | 210/63 |
| 3,349,031 | 10/1967 | Hatch et al. | 210/50 |
| 3,442,802 | 5/1969 | Hamilton et al. | 210/63 |
| 3,487,016 | 12/1969 | Zeff | 210/63 Z |
| 3,523,891 | 8/1970 | Mehl | 210/63 Z |
| 3,549,538 | 12/1970 | Armstrong | 210/63 Z |
| 3,713,782 | 1/1973 | Watt | 23/288 F |
| 3,725,264 | 4/1973 | Wheeler | 210/44 |
| 3,732,163 | 5/1973 | Lapidot | 210/63 Z |
| 3,853,483 | 12/1974 | Cross, Jr. | 23/288 F |

FOREIGN PATENTS OR APPLICATIONS 1,147,897  4/1963  Germany ..................... 210/63 Z

OTHER PUBLICATIONS

Chen J. W. et al, "Feasibility Studies of Applications of Catalytic Oxidation in Wastemaker" So. Ill. Univ. Nov. 1971, pp. 27, 28, 31–37.

Primary Examiner—Frank A. Spear, Jr.
Assistant Examiner—Benoit Castel
Attorney, Agent, or Firm—Brown & Martin

[57] ABSTRACT

A powdered metal oxide such as manganese trioxide, ferric, copper and nickel oxide is positioned in a tank. The tank receives a quantity of effluent that is to be rendered inert by ozone gas that is injected into the container. The oxide acts as a catalyst, in that the amount of ozone otherwise required to oxidize the fluid sufficiently to kill the bacteria and render the fluid inert is substantially reduced. The metal oxide may be utilized in the form of a powder contained in fabric bags, disposed on substrates in the tank, or dispersed within the fluid.

6 Claims, 3 Drawing Figures

OZONE OXIDATION OF WASTE WATER

BACKGROUND OF THE INVENTION

The purification of waste water has experienced considerable technical development in recent years. While various treatments utilize different processes, the utilization of chlorine to oxidize the contaminants and bacteria is perhaps the best known and most advanced method of treatment. While ozone has many advantages over chlorine in the treatment of waste water, the utilization of ozone has been limited because it is expensive to generate and must be used in relatively large quantities. The instant invention is directed to a method and apparatus for increasing the efficiency of an ozone-based oxidation system.

SUMMARY OF THE INVENTION

It is a primary object of the instant invention to provide a new and improved method of extending the potency of a given dose of ozone in waste water recirculation systems.

Another object of the instant invention is the provision of an oxidation based waste water recirculation system that utilizes a transition metal oxide catalyst to extend the dose potency of the ozone.

A further object of the instant invention is the provision of an oxidation based waste water recirculation system wherein the oxide catalyst is recoverable.

In accordance with the preferred embodiment of the invention, a transition metal oxide such as manganese trioxide, ferric oxide, nickel oxide and copper oxide is introduced into a system that uses ozone gas to kill bacteria and to thereby render the fluid purified and inert.

In one embodiment of the invention, powdered transition metal catalyst is contained in fluid pervious bags that are submerged in a tank of waste water to be purified. Ozone is injected into the fluid and the fluid is permitted to flow freely over the powdered metal catalyst and through the bags. The oxide catalyst increases the efficiency of the ozone oxidation of the waste water without becoming depleted.

In another embodiment, substrates of the transition metal oxide catalyst are suspended within the tank containing the waste water. Ozone is injected into the fluid. The oxidation efficiency is increased by the presence of the transition metal oxide catalyst. However, the catalyst remains undiminished so that it is available to maintain the efficiency of the ozone in purification of waste water.

In another embodiment, waste water passes through a tank. A quantity of pelletized transition metal oxide is disposed in the fluid within the tank. Ozone gas is injected into the tank and the waste water is oxidized to render it inert and purified. The purified water is then passed into a holding tank. The holding tank separates metal oxide pellets from the water. The pellets are recovered and reinjected into the primary tank.

The above and other aspects of the instant invention will be more apparent as the description continues and when read in conjunction with the appended drawings.

DETAILED DESCRIPTION OF THE DRAWINGS

It has been found that, in the presence of a transition metal oxide catalyst, such as manganese trioxide, ferric oxide, nickel oxide and copper oxide, the efficiency of a given dose of ozone is greatly increased and accordingly a given amount of waste water may be purified by a smaller dose of ozone that has heretofore been possible.

Figure 1:
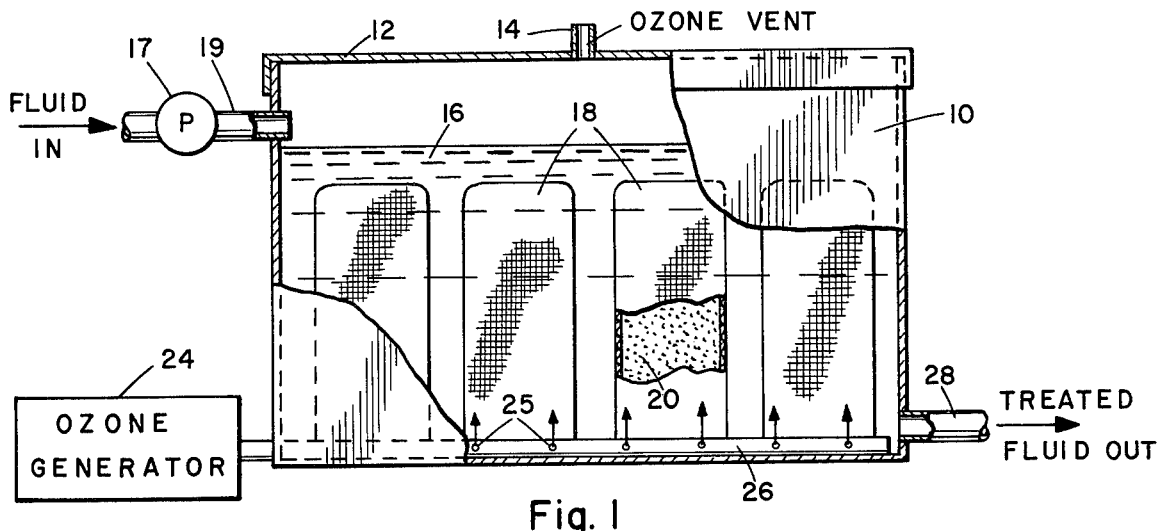
FIG. 1 is a side elevational view of the parts broken away of an embodiment of the invention utilizing fluid pervious bags.

Referring to FIG. 1, a processing tank 10 has a lid 12 and a vent 14. The tank 10 contains a quantity of waste water 16 that is pumped into tank 10 via pump 17 and conduit 19. The waste water may include germs and bacteria such as are frequently found in waste water. Fabric bag 18 is supported in tank 10 submerged in the waste water 16. The bags 18 are comprised of a synthetic fabric with a 100 denier mesh size. They contain a quantity of powdered transition metal oxide 20. The particles of powdered oxide are sized so that they will not pass through the openings in the fabric. An ozone generator 24 injects ozone bearing gas into the bags 18 via nozzles 25 formed in conduit 26. The ozone bearing gas passes over and agitates the powdered oxide in the bags. A conduit 28 discharges the treated water out of the tank 10.

Figure 2:
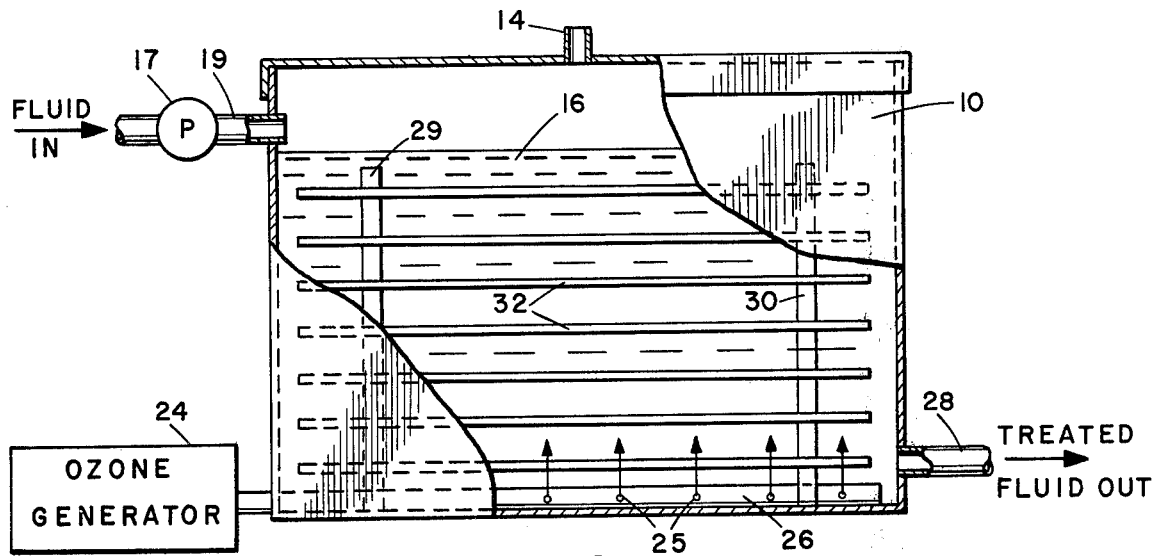
FIG. 2 is a similar view of another embodiment of the invention which utilizes substrates of the transition metal oxide.

FIG. 2 illustrates a tank similar to the tank 10 of FIG. 1. However, in this embodiment the metal oxide is coated on substrates 32. The substrates are supported within the tank by means of the supports 29 and 30, and provide a large surface area of contact with the waste water 16. As in the first described embodiment, the ozone bearing gas is injected into the tank 10 from a conventional ozone generator 24 via the conduit 26 and the nozzles 25. The gas rises in the tank and contacts the substrates. The nozzles 25 are positioned directly below the substrates 32. Purified water is discharged through conduit 28.

Figure 3:
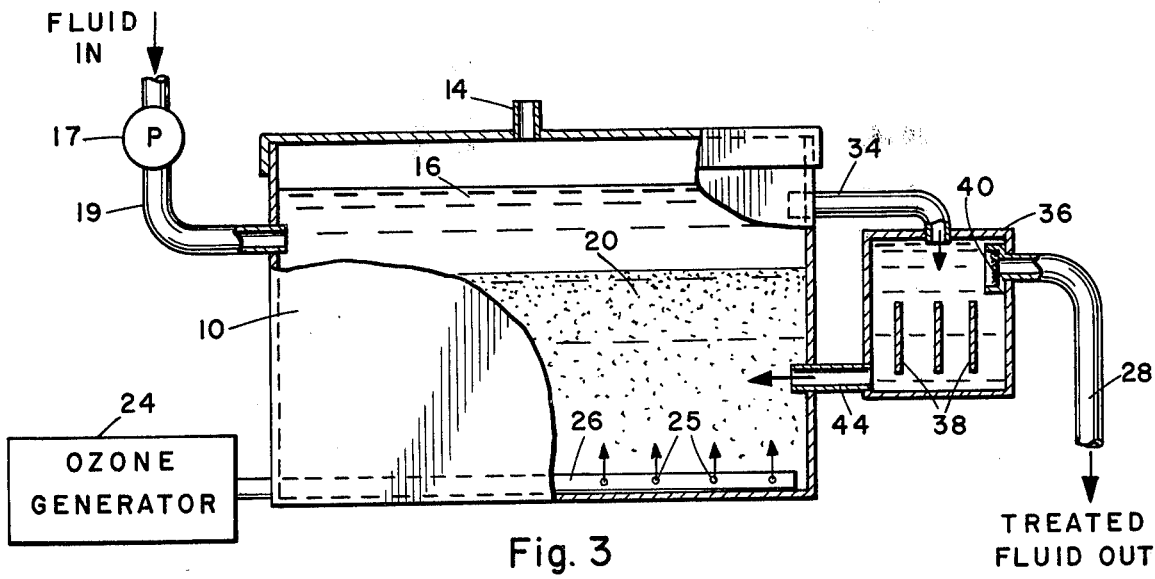
FIG. 3 is a similar view of a third embodiment of the invention wherein the powdered transition metal oxide is dispersed within the fluid.

In the embodiment illustrated in FIG. 3, transition metal oxide is dispersed in the tank 10 in the form of oxide pellets 20. The oxide pellets have a specific gravity greater than water and therefore tend to accumulate at the bottom of the tank 10. However, they are stirred and dispersed by the entry of the ozone bearing gas through the nozzle 25. The oxidation process takes place as described above. The purified water is then drawn off through the conduit 34 into a holding tank 36.

The holding tank 36 includes a series of baffles 38 to prevent excessive agitation of the purified water. The water in the holding tank 36 contains some oxide pellets which transfer to the holding tank as the purified water is passed into the tank. A filter 40 prevents the oxide pellets from being discharged out of the holding tank 36 along with the purified water. Conduit 44 transfers oxide pellets back into the tank 10 as they settle out in the holding tank 36.

The following examples are presented to further illustrate the invention without in any way limiting the scope thereof.

EXAMPLE 1

Water with a quinoline ($C_9H_7N$) concentration of approximately 0.25 milligrams per liter was prepared and placed in a vessel containing $Mn_2O_3$ in a 100 milligram per liter concentration. Quinoline is a test reagent containing organic functional groups that is utilized to determine the effectiveness of oxidants on organic compounds. The quinoline concentration was measured at 1 minute intervals to determine the time at which a 25% reduction in quinoline concentration was obtained. Air containing 1 ½% ozone by volume was bubbled through the solution. The ozone flow rate was adjusted to obtain a concentration of 1 part per million ozone to test solution. The temperature of the test solution was 70° F, the pH of the solution was 7. Pressure was atmospheric. After 20 minutes the quinoline was reduced by 25%. The test was then repeated utilizing all of the same test parameters and components but omitting the catalyst. The time to obtain a 25% reduction in quinoline was determined to be 40 minutes.

EXAMPLE 2

Utilizing the same vessel and ozone concentration as in Example, tests were carried out to determine the effectiveness of $Fe_2O_3$ as a catalyst. The catalyst concentration was 100 milligrams per liter. The time to obtain a 25% reduction in qunilone with catalyst was 20 minutes and without was 40 minutes.

EXAMPLE 3

Example 1 was repeated except that the catalyst utilized was CuO. The time to obtain a 25% reduction in quinoline was 18 minutes with catalyst and 40 minutes without catalyst.

EXAMPLE 4

Example 1 was repeated except that the test was carried out at a pressure of 2 atmospheres. The time to obtain a 25% reduction in quinoline with catalyst was 17 minutes and without was 40 minutes.

EXAMPLE 5

Example 1 was repeated except that the catalyst concentration was increased from 100 milligrams per liter to 500 milligrams per liter. The time to obtain a 25% reduction in quinoline was 14 minutes with catalyst and 40 minutes without.

EXAMPLE 6

Example 1 was repeated except that NiO was utilized as the catalyst. The time to obtain a 25% reduction in quinoline was 24 minutes.

EXAMPLE 7

Example 1 was repeated except that the temperature of the solution was maintained at 60° F. The time to obtain a 25% reduction in quinoline concentration with catalyst was 24 minutes and without catalyst 41 minutes.

EXAMPLE 8

Example 1 was repeated except that the solution was maintained at 80° F. The time to obtain a 25% reduction in quinoline concentration was determined to be 24 minutes with catalyst and 43 minutes without.

EXAMPLE 9

Example 1 was repeated except that the concentration of the catalyst was maintained at 500 milligrams per liter. The time to obtain a 25% reduction in quinoline concentration with catalyst was determined to be 14 minutes and the time to obtain the same reduction without catalyst was 40 minutes.

EXAMPLE 10

Example 1 was repeated except that the pH of the test solution was maintained at 6. The time to obtain a 25% reduction in quinoline concentration with catalyst was 19 minutes and without catalyst was 41 minutes.

EXAMPLE 11

Example 1 was repeated except that the pH of the solution was adjusted to a pH of 8. The time to obtain a 25% reduction in quinoline concentration with catalyst was 19 minutes and without catalyst was 44 minutes.

EXAMPLE 12

Example 1 was repeated except that the flow rate of the air ozone mixture was increased to produce and maintain a concentration five parts per million of ozone in the solution. The time to obtain a 25% reduction in quinoline concentration was determined to be 12 minutes with catalyst and 18 minutes without catalyst.

Thus the use of a transition metal oxide catalyst increases the efficiency of an ozone oxidation waste water recirculation system. The resulting reduction in ozone requirements results in a substantial cost reduction in system operation.

Having described my invention, I now claim:

1. A method of ozone oxidation of waste water containing organic contaminants and bacteria comprising the steps of:
    injecting the waste water into a closed tank,
    submerging fluid pervious bags with powdered transition metal oxide catalyst therein into the tank substantially filled with the waste water for oxidizing with ozone,
    restraining the catalyst in said fluid pervious bags,
    said catalyst being selected from a group consisting of manganese trioxide, ferric oxide, nickel oxide and copper oxide,
    injecting ozone from a source of ozone into said bags in the waste water for exposure to said catalyst and for reacting with and rendering the waste water flowing through said bags, purified and inert,
    drawing the purified water out of the tank,
    and venting the ozone out of the upper portion of the tank.

2. The method of ozone oxidation of waste water containing organic contaminants and bacteria comprising the steps of:
    introducing the waste water through a first pipe inlet into a closed tank containing a quantity of pelletized transition metal oxide catalyst for oxidizing the ozone,
    said transition metal oxide catalyst being selected from the group consisting of manganese trioxide, ferric oxide, nickel oxide and copper oxide,
    injecting ozone from a source of ozone into said tank for contacting said catalyst and for rendering said waste water inert, drawing off the inert water through a pipe discharge located above the normal upper surface level of the oxide into a holding tank, filtering out the pelletized metal oxide from the inert water in the holding tank and passing the filtered pelletized metal oxide back into the tank, discharging the inert water out of the holding tank, and venting the ozone out of the tank.

3. The method claim of claim 2 including the step of: reducing agitation of the fluid in said holding tank by a series of parallel vertically shaped baffles.

4. Apparatus for treating waste water containing organic contaminants and bacteria to ozone oxidation, comprising a closed tank for containing a quantity of the waste water, an inlet for inserting waste water into the tank and an outlet for drawing treated water from the tank, said tank containing a quantity of catalyst having a substantial surface area for oxidizing the ozone, said catalyst comprising transition metal oxide in particulate form retained in at least one fluid pervious fabric bag, ozone generator means connected to the tank for generating and introducing ozone bearing gas into the fabric bag at the lower portion thereof and for passing bubbles of ozone bearing gas through the catalyst, said fabric bag having a mesh size that is substantially smaller than the bag size of the particulate catalyst, vent means for venting the ozone from the top of the closed tank and said fabric bag being secured in position to receive said ozone and being spaced from the side walls of said tank.

5. Apparatus according to claim 4 wherein said fabric bag has a mesh size of approximately 100 denier.

6. Apparatus for treating waste water containing organic contaminants and bacteria to ozone oxidation, comprising a closed tank for containing a quantity of the waste water, said tank having an inlet for receiving the waste water, said tank containing a quantity of a catalyst, ozone generator means connected to said tank for generating ozone and introducing ozone bearing gas into the tank at the lower portion thereof and for passing bubbles of ozone bearing gas over said catalyst and into the waste water for purifying the waste water, said catalyst comprising transition metal oxide in particulate form having a substantial surface area and a specific gravity greater than the specific gravity of the waste water, a discharge conduit having a water receiving opening positioned above the normal upper level of the catalyst for drawing off the purified water, a holding tank connected to the discharge conduit for receiving the purified water and separating the particulate catalyst from the purified water, said holding tank having a discharge line for returning the separated particulate catalyst to the closed tank, said holding tank including a plurality of internal baffles and having a purified water discharge outlet, filter means in said discharge outlet for filtering said particulate catalyst from the water passing into the discharge outlet, and vent means for venting the ozone from the top of the closed tank.

* * * * *